United States Patent [19]
Gilbert

[11] 3,875,022
[45] Apr. 1, 1975

[54] AUTOMATIC ELECTROMETRIC ANALYSIS

[76] Inventor: Jack J. Gilbert, 3 River Rd., Suffern, N.Y. 10901

[22] Filed: July 25, 1974

[21] Appl. No.: 491,886

Related U.S. Application Data

[62] Division of Ser. No. 275,298, July 26, 1972.

[52] U.S. Cl........... 204/1 T, 204/195 L, 204/195 M
[51] Int. Cl. ............................................. G01n 27/46
[58] Field of Search............ 204/1 T, 195 R, 195 L, 204/195 M, 195 G, 195 P, 212

[56] References Cited
UNITED STATES PATENTS

| | | | |
|---|---|---|---|
| 2,108,294 | 2/1938 | Doyle et al. | 204/195 G |
| 3,043,764 | 7/1962 | Harvey | 204/1 T |
| 3,196,095 | 7/1965 | Wadsworth | 204/212 |
| 3,498,889 | 3/1970 | Imredy et al. | 204/195 P |

*Primary Examiner*—T. Tung
*Attorney, Agent, or Firm*—Maynard R. Johnson

[57] ABSTRACT

Apparatus for electrometric analysis is described in which a liquid specimen is poured into a wide-mouthed sample cup in which a detector electrode is disposed. The cup rotates to mix the specimen during analysis. After analysis, the rotation of the cup increases to expel the specimen by centrifugal force.

1 Claim, 2 Drawing Figures

AUTOMATIC ELECTROMETRIC ANALYSIS

CROSS-REFERENCE TO RELATED APPLICATION

This is a division, of application Ser. No. 275,298 filed July 26, 1972.

BACKGROUND OF THE INVENTION

The present invention is concerned with automated electrometric analysis of liquid specimens. Many systems are known for analysis of chemical substances in liquids by means of electrical measurements, e.g., potentiometric, coulometric, chronoamperometric and voltammetric analyses and combination techniques such as coulometric titration. Since such measurements all involve measurement by means of the electrochemical properties of the liquid specimen under analysis, the chemical substances being analyzed can be conveniently referred to collectively as "electrochemically-measurable substances."

Apparatus for carrying out automatic electrometric analyses generally comprise a sample cell or vessel for holding a liquid specimen to be analyzed; one or more electrode for detecting an electrochemically-measurably substance positioned to contact the liquid specimen; a supply pump or the like and associated conduits for pumping successive specimens to the sample cell, and waste conduits through which liquid specimens leave the cell after analysis. The supply pump, supply conduits, sample cell and waste conduits generally have the configuration of a continuously bounded conduit (with different internal geometry at different locations), air bubbles, or portions of each liquid specimen being used to flush the preceding specimens from the cell.

Such devices are susceptible to errors resulting from electrical ground currents which can be conducted through liquid in the supply and waste lines to ground. Although the fluid circuitry is generally fabricated from non-wettable and electrically non-conductive material, such materials can support a thin film of liquid sufficient to conduct a spurious electric current between the electrodes and the pump, waste liquid receptacle, sampler, etc. Such spurious current can adversely affect the accuracy and precision of the electrometric analyses, and become particularly significant as the electrical quantities to be measured become smaller. It would be desirable to provide an automatic apparatus in which such ground currents can be eliminated.

SUMMARY OF THE INVENTION

The present invention is directed to an improved apparatus and method for automatic electrometric analysis of electrochemically-measurable substances in liquid specimens. The invention provides a wide-mouthed, rotatably mounted cup for containing a liquid specimen; means for disposing electrodes in the cup to contact a specimen, and means for pouring a specimen into the cup across an intervening air gap. The cup is adapted to rotate at a relatively low speed for specimen mixing during analysis; and at a relatively high speed for centrifugal specimen removal after analysis. The invention provides for specimen supply and removal across air gaps, and substantially eliminates errors introduced by spurious ground currents carried through fluid conduits used to supply and remove specimens.

The device of the invention provides electrometric determinations to be carried out on a liquid specimen in a rotatable cup 24. The cup 24 is adapted to rotate about a generally vertical axis with its mouth uppermost, the axis being through the mouth of the cup. A cell housing 14, spaced from the cup 24, encloses the mouth of the cup 24. An electrometric sensing electrode, e.g. electrodes 44, 46, 48 are carried on the housing and extend into the mouth of the cup 24 to contact the liquid specimen 5. Housing 14 also includes a specimen inlet port 50 situated vertically above the mouth of the cup 24, but spaced from the cup. There is thus no continuous solid surface connecting port 50 and the cup 24 which is capable of supporting a liquid film.

In the device of the invention the introduction of liquid specimens into the sample cup 24 is thus most aptly characterized as "pouring" the liquid from port 50 downward through the intervening space, as distinguished from terms such as "conducting", "flowing" or "pumping" which tend to imply a solid conduit. After the electrometric measurement is completed, the liquid specimen 5 is removed from cup 24 by centrifugal force when the cup is rotated at a high speed, by a suitable rotating means, e.g., an electric motor 19 connected to the bottom of the cup. The centrifugally-expelled liquid is collected in the housing 14, spaced from the cup 24, and can then be withdrawn through a waste line 40.

The invention thus eliminates the effect of ground currents through a supply line and pumps, by providing an air space between the specimen under analysis and the inlet port 50. Removal of specimens by centrifugal force from the rotating cup 24 to the housing 14 across another air space, similarly eliminates ground currents through a waste line. The invention also provides for rotation of the cup at a relatively slow rate during the electrometric measurement to provide continuous mixing of the liquid specimen. Mixing by rotating the cup has been found to provide better mixing of samples and improved analytical results as compared to mixing with a magnetic stirrer or propellor. Additionally, elimination of extraneous stirring devices minimizes the risk of spurious ground loops through a propellor shaft or the like and permits reduction of sample volume requirements, by eliminating the additional space required for stirring devices.

Other advantages of the invention will be apparent on consideration of the following specification and the Figures of the Drawing.

BRIEF DESCRIPTION OF A PREFERRED EMBODIMENT

Figure 1:
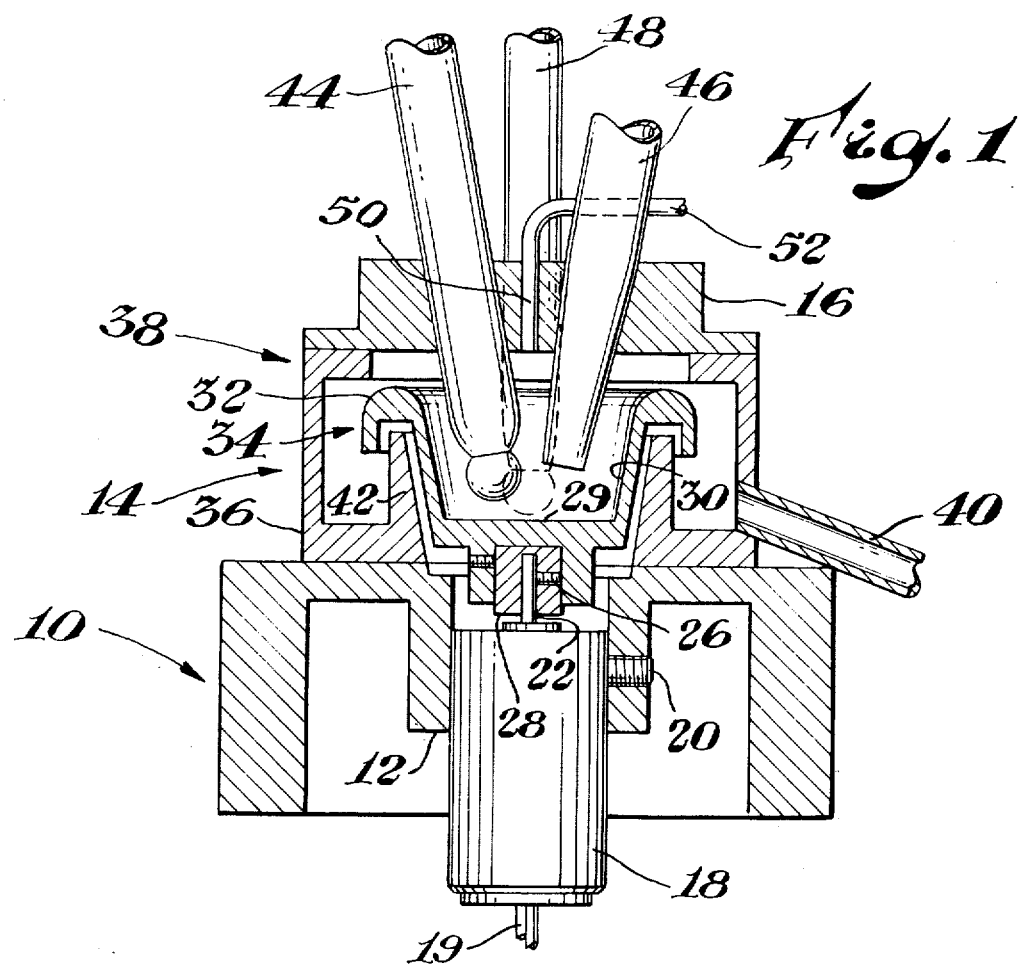
FIG. 1 is an elevational view partly in section illustrating an apparatus of the invention, showing a wide-mouthed cup 24, rotatably mounted in a housing 14, with electrodes 44, 46, 48; a specimen supply port 50 and specimen removal conduit 40, both spaced from cup 24 to provide an air gap.

Referring particularly to FIG. 1, the analysis cell assembly includes a base 10 including a motor support 12, a cell housing 14 and an electrode holder 16 mounted generally over the cell housing 14. Motor 18 is mounted partially with the motor support 12 and maintained in position by a set screw 20. The shaft 22 of motor 18 extends upwardly within support 12. Cup 24 is mounted on shaft 22 by means of set screw 26 and adapter 28.

The cup 24 has a generally flat interior floor 29 and a side wall 30 which is slanted outward from the bottom 29 to the rim 32 and includes a downwardly extending lip 34. The interior of the cup 24 thus has the configuration of the frustum of an inverted cone with the rounded upper rim 32 at the cup mouth having the larger diameter, the diameter decreasing toward the floor 29 of the cup. Side wall 30 preferably slants outward at an acute angle, for example, from about 5° to about 30°, from the axis of rotation on shaft 22 to optimize maximum sample depth within cup 24 in relation to sample volume, while providing a continuous outward slope to facilitate centrifugal draining.

Cell housing 14 includes a floor 36 and a cylindrical side wall 38, upon which an electrode holder 16 is mounted. A drain port 40 extends through a portion of side wall 38, angled downwardly from the intersection of floor 36 and side wall 38 to carry waste liquid from the housing 14 to a suitable waste receptacle. Housing 14 also includes a cylindrical back splash wall 42 which extends upwardly from floor 36 into the interior of housing 14 and surrounding cup 24. As illustrated in FIG. 1, wall 42 extends upwardly toward the underside of cup rim 32 in a nesting relation between the lip 34 and side wall 30 of the cup 24, but spaced from the lip 34 and wall 38 so that cup 24 is free to rotate without contacting the back splash wall 42 or another portion of housing 14.

A plurality of electrodes, e.g. ion selective sodium electrode 44, potassium electrode 46 and reference electrode 48 are mounted in electrode holder 16, extending therethrough into the cup 24, and spaced from the floor 29 and side wall 30 so as to prevent contact with the cup 24 during rotation. Electrode holder 16 also includes a supply duct 50 which provides communication between the inside of housing 14 and the exterior of the cell for introduction of liquid samples. A connection tube 52 provides fluid connection between duct 50 and diluter pump 54.

As shown in FIG. 1, duct 50 is positioned vertically above the interior of cup 24 so that liquid introduced through the duct 50 will fall into cup 24. Electrode holder 16, and duct 50 are spaced above the upper rim 32 of cup 24 so that duct 50 will be spaced from and above the level of any liquid in the cup 24.

The cup 24, housing 14 and electrode holder are all fabricated of suitable rigid material such as glass, acrylic polymers, chloro or fluorohydrocarbon polymers or other polymers, which are chemically inert to the liquids to be analyzed and electrically non-conductive. The electrodes 44, 46, 48 can be conventional ion selective electrodes, and a conventional reference electrode, such as are described, for example, in U.S. Pat. Nos. 3,398,066; 3,429,785 and 3,562,129.

While the embodiment described herein in detail utilizes cation selective electrodes for potentiometric analysis of sodium and potassium, it will be apparent that the invention is equally applicable to other potentiometric analyses as well. The apparatus can be adapted to many different potentiometric analyses of one or more electrometric factors, such as calcium, pH, ammonium, cyanide, chloride, etc., by changing the number and type of electrodes. It will also be apparent that the device can be used for other electrometric measurements by appropriate selection of conventional electrodes and circuitry to adapt the device for coulometric analysis, chronoamperometric analysis, voltammetry, coulometric titration, etc.

Figure 2:
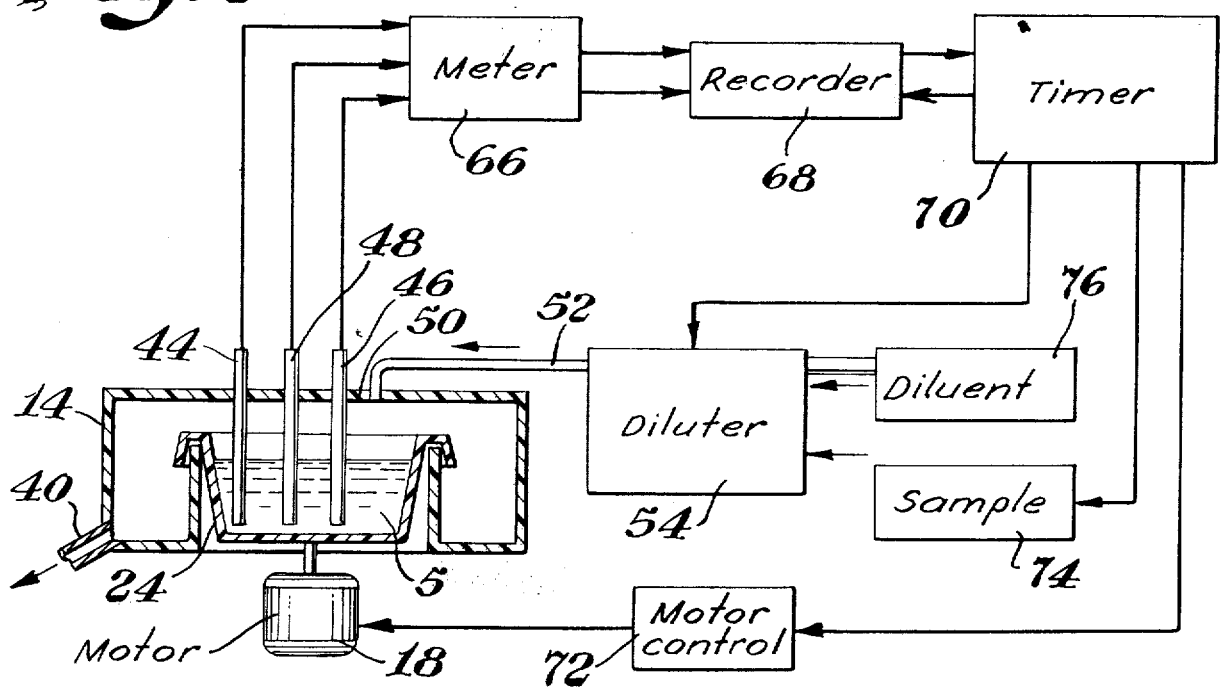
FIG. 2 is a diagram further illustrating an apparatus of the invention.

FIG. 2 further illustrates the overall apparatus. Electrodes 44, 46, and 48 are electrically connected to a meter 56 which can be of conventional design used in electrochemical analyses. Meter 56 includes conventional circuitry, filters, amplifiers, etc. for providing electrical signals corresponding to the concentration of the substance or substances to be measured. In the embodiment described in the drawing, meter 66 thus provides signals corresponding to the concentrations of sodium ion and potassium ion in accordance with known principles.

The outputs from meter 66 are connected to a conventional recorder 68 adapted to record the results of the measurement, and to signal another component that a result has been recorded. Recorder 68 and meter 66 are both connected to a timer 70, which is also connected to motor 18 via motor control 72 and to a diluter-pump 54. Motor control 72 can be any suitable arrangement for controlling the speed of the motor 18 to provide two speeds of rotation for the cup 24, e.g., by switching between high and low voltage power supplies, for example. Diluter-pump 54 is in fluid connection with sources of a sample liquid (indicated in FIG. 2 at 74), with a source of a liquid diluent (76) and with cup 24 via tube 52 and port 50.

Diluter-pump 54 can be a power-driven diluter of the calibrated syringe type adapted to draw predetermined amounts of liquid sample and diluent from separate sources 74, 76, and to pump the sample and diluent through tube 52 and port 50. Port 50 is disposed over cup 24 and spaced well above the liquid level so that ground currents through the sample supply system are eliminated.

In operation the sequence of events is controlled by the timer 70. In response to the timer 70, sampler 74 and diluter 54 are activated, so that a sample, e.g., 200 microliters of human serum, and a diluent, e.g., 6 milliliters of a sodium and potassium-free buffer solution, are metered and delivered through line 52 and port 50. Diluter 54 has been calibrated to supply sufficient of the sample and diluent to cup 24 so that the tips of electrodes 44, 46, 48 are below the level of liquid 5 and thus in good electrical contact with the diluted sample.

The timer 70 then deactivates the diluter 54 and activates motor control 72 to start motor 18 at low speed. Control 72 and motor 18 have been preselected so that, at the low speed, cup 24 rotates at a rate sufficient to achieve mixing of liquid 5, but slowly enough so that liquid 5 is not driven out of cup 24 by centrifugal force. With a cup 24 about 3.6 centimeters deep, having a cup floor 29 with a diameter of about 2.6 centimeters, and side walls slanted outward at an angle of 10° from vertical, a mixing speed of about one to 6 revolutions per second, and a centrifugal draining speed of about 10 to 15 revolutions per second are convenient for use with many aqueous specimens. The immersed portions of the electrodes 44, 46, 48 facilitate uniform liquid mixing during rotation of cup 24, and placement of the electrodes 44, 46, 48 radially outward from the axis of rotation further ensures uniform flow of liquid 5 past the electrodes.

While cup 24 is thus rotating at low speed, timer 70 activates the meter 66 and recorder 68. Meter 66 measures the sodium and potassium concentrations detected by electrodes 44 and 46 and the common reference electrode 48 potentiometrically. The outputs from meter 66, corresponding to the sodium and potassium concentrations in the liquid 5 are transmitted to the recorder 68 and recorded. Timer 70 then deactivates the meter 66 and recorder 68, and shifts the motor control to high speed. At the high rotation speed, the liquid 5 is expelled from cup 24 by centrifugal force. Due to the outwardly slanting sides 30 of cup 24, all of the liquid 5 moves up and over the cup rim 32 and is thrown off against the side wall 38 of housing 14. During the centrifugal speed rotation, the overlap of the downwardly projecting cup lip 34 and back splash wall 42 prevents liquid from splashing back against the outside of cup 24. This configuration of lip 34 and back splash wall 42 prevents waste liquid from splashing onto the motor 18 and also minimizes the risk of forming a film of splashed liquid on the outside of cup 24 with possible formation of a ground loop to the motor.

The liquid expelled centrifugally from cup 24 is collected in housing 14 and removed through drain port 40 to waste or subsequent further analysis. Timer 70 then deactivates the high speed operation, and the devices is ready to begin a second operating cycle.

The rotation rates of cup 24 are dependent on a variety of factors such as viscosity of the liquid specimen, temperature, the radius of the cup 24 and angle at which the side wall 30 slants outward from vertical. In various cup configurations, at the high, centrifugal draining speed the cup should theoretically rotate at a rate (in revolutions per second) greater than $$\sqrt{(g \cot \theta / 4\pi^2 R)}$$

wherein $g$ is acceleration due to gravity, $\theta$ is the smallest angle of the side wall 30 from the vertical axis of rotation, (i.e., at the steepest point on the side wall 30) and R is the smallest radius of the cup 24 at the steepest point. In a cup 24 having a flat floor 29 and straight side wall 30, $\theta$ would be the same at various locations on the side wall 30, and R is the radius of the cup floor 29. At rotation rates equal to or less than that set out above, centrifugal force can be insufficient to move all of the liquid from the cup.

At the low, mixing speed the rotation rate should be less than $$\sqrt{(g \cot \theta' / 4\pi^2 R')}$$

wherein $g$ is acceleration due to gravity, $\theta'$ is the angle of the side wall 30 from vertical at the mouth of the cup 24 (the inside of the rim 32) and R' is the radius of the mouth of the cup 24 (the maximum internal radius). At higher rotation rates, centrifugal force may be sufficient to move some of the liquid specimen up and out of the cup 24 during mixing and measurement, and vortex formation at such higher rates can interfere with measurements. In various applications, factors such as viscosity, friction, desired measurement time and desired draining time may permit the use of somewhat higher mixing speeds and will generally require higher speeds for efficient centrifugal draining.

Various modifications of the apparatus can be made without departing from the spirit of the invention. For example, the floor 29 of cup 24 can be provided with radial ridges which serve as impeller vanes to enhance low speed mixing, or the external cup wall 30 can include air impeller vanes or shaft 22 can carry a fan to direct air currents upwardly between back-splash wall 42 and the cup 24 to further minimize the possibility of liquid contact between the lip 34 and housing 14. Also, the cup geometry may be altered to provide a dish shaped cup, paraboloid cup or various other shapes which provide an outwardly slanting side wall, and various types of electrodes and electrode configurations may be employed.

I claim:
1. A method useful for analysis of liquid specimens for an electrochemically-measurable substance comprising:
   providing a cup to hold a liquid specimen;
   providing a sensing electrode adapted to measure the electrochemically-measurable substance;
   pouring a liquid specimen into the cup from a point above the ultimate liquid level in the cup;
   contacting the liquid in the cup with the sensing electrode;
   rotating the cup at a first rate sufficient to result in liquid flow past the sensing electrode;
   measuring the electrometric factor while the cup is rotating; and thereafter,
   rotating the cup at a second rate substantially greater than the first rate, the second rate being sufficient to expel the liquid from the cup by centrifugal force.

* * * * *